United States Patent Office 2,922,028
Patented Jan. 19, 1960

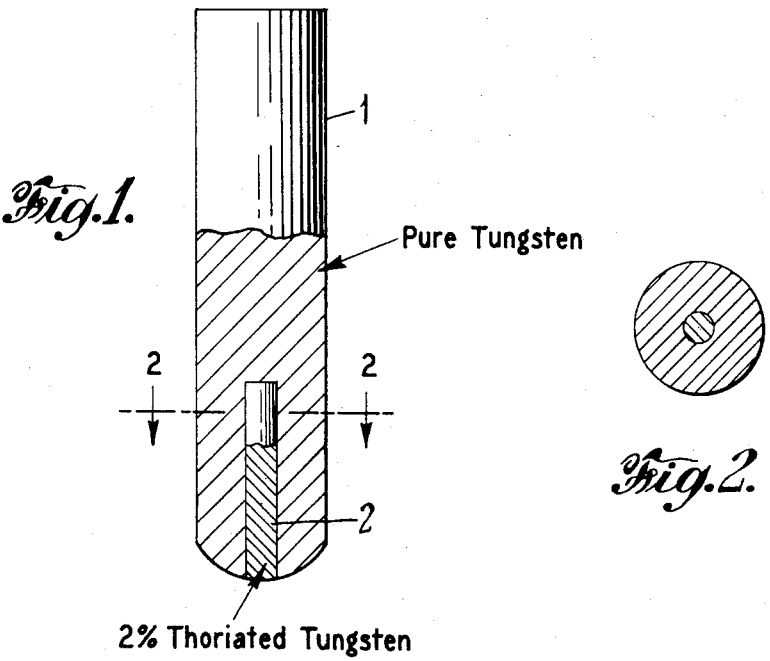
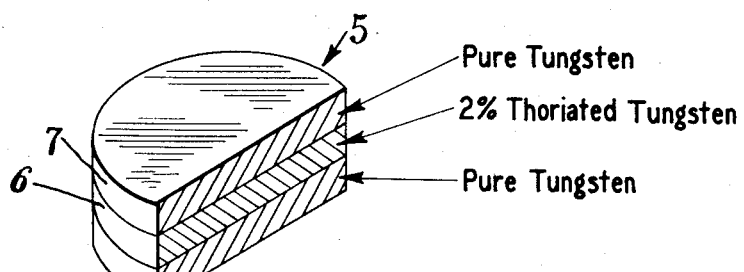

2,922,028
ELECTRIC ARC ELECTRODES

Thomas E. Butler, Niagara Falls, and John A. Persson, Kenmore, N.Y., assignors to Union Carbide Corporation, a corporation of New York Application November 25, 1957, Serial No. 698,762

4 Claims. (Cl. 219—145)

This invention relates to electric arc electrodes, and more particularly to welding and recitifier electrodes that are relatively non-consumable in use.

Briefly, according to the invention, there is provided an electrode consisting of a swaged thoriated tungsten insert from which the arc is drawn, and an arc current carrying support for such thoriated tungsten insert, that is composed of substantially pure tungsten. In one modification the support is a tungsten body having a socket in which is mounted an insert of swaged thoriated tungsten. In another, the electrode consists of a pair of tungsten supports between which is sandwiched a swaged thoriated tungsten disc.

The electrodes of the invention are particularly suitable for use as a cathode in arc rectifiers, and as electrodes in inert gas-shielded arc welding, specific advantage and utility thereof arising from the new composition and novel method of construction, which features combine to facilitate stabilization of the arc by confining the arc cathode spot to a predetermined area.

In arc welding or other applications where an electric arc is utilized for the passage of current, it is imperative in many cases, and desirable in most, that a uniform voltage be maintained. This is usually accomplished by maintaining a critical spacing between the anode and cathode. However, a major difficulty invariably encountered in arc-conducted currents is arc instability in the form of a wandering cathode spot. In circumstances where the arc spot wanders over the surface of the cathode indiscriminately, sometimes elongating the arc to an excessive extent, the required amount of voltage cannot be maintained by attachments to the primary apparatus, which controls the distance between anode and cathode.

Electrode efficiency, as related to the conduction of currents, is dependent to a great degree on its cross-sectional area. In instances where high currents are employed, an electrode having a proportionately higher cross section is advantageous since resistance to the passage of current is a volumetric function. Of course, electrodes having a correspondingly larger diameter for higher currents may be employed. The lowering of resistance and increased overall efficiency in other respects attendant with their use, however, are offset by the simultaneous establishment of conditions which encourage arc instability. This is due to the large surface area of the tips of electrodes of large diameter, and the tendency for the arc to wander over this surface indiscriminately. This condition prevails when either pure tungsten, thoriated tungsten, or other high-melting point metals are employed as non-consumable electrode material. A solution of this problem which, it was thought, would allow the use of larger-diameter electrodes without accompanying arc instability, was to taper the arcing end of the electrodes to a point. This provided only temporary relief, however, since, in the intense heat of the arc, the point was either melted away or volatilized in a relatively short period of time.

The problem then exists that thin electrodes, conducive to arc stability because of small surface areas at their tips, cannot dissipate the heat generated by high currents quickly enough and build up excessively high resistance to the flow of current. On the other hand, electrodes of larger cross section, though more efficient in the dissipation of heat and conduction of high currents, are, nevertheless, contributive in producing conditions of arc instability.

The conditions occasioned by the above problems are wholly undesirable, and much work has been done to develop electrodes which are useful at high currents and with which stable arc cathode spots may be produced.

The problems stated above are exceptionally relevant to an arc rectifier in which pure tungsten or thoriated tungsten in the form of a circular disk is mounted within a copper anode ring, between which electrodes a narrow space was permitted to exist. An arc is struck in the gap between the two electrodes and impelled to rotate in the circular space by magnetic means. A major problem encountered with such device was the tendency for the arc to wander over the surface of the cathode, thereby elongating the arc to a point where high voltages were required than are commercially permissible to maintain the proper current. A particular feature of rectifiers which lends itself to wide commercial applicability is continued and efficient operation at low voltages. It is important, therefore, in the arc rectifier under discussion, that the establishment of any means by which the arc could be restricted to the critical space existing between the two electrodes, and thus prevented from wandering, would serve a highly useful purpose.

The primary object of this invention, therefore, is the provision of an electrode, the structure and composition of which effectively prevent wandering of the arc cathode spot.

It is a further object of the invention to provide an electrode of novel composition and structure for improving arc stability in any application where an arc is employed for conveying electric currents and where it is important that a critical arc length be maintained for supplying a uniform current at relatively low voltages.

A still further object of the invention is to present an electrode which may be constructed to a diameter sufficiently large to accommodate high currents and which, because of its novel structure, is also capable of producing stable arcs at relatively low currents.

The above objectives are realized by the discovery that a cathode spot may be more readily formed on the hot surface of metals treated with certain compounds than on that of a pure metal. In accordance with the invention, therefore, a cathode of composite structure is employed of pure tungsten and thoriated tungsten containing about 2% thoriated tungsten. It has been experimentally confirmed that in cathodes containing both materials, the cathode spot will consistently form on the thoriated tungsten portion. The tendency for the arc to wander may thereby be suppressed if the construction of the cathode is such as to encourage the confinement of the arc cathode spot.

In the drawings:

Fig. 1 is an elevational view of an arc welding electrode with parts broken away, illustrating the invention;

Fig. 2 is a cross-section taken on line 2—2 of Fig. 1; and

Fig. 3 is a perspective view of a rectifier electrode modification cut in half and shown in vertical cross-section.

As shown in Figs. 1 and 2, a tungsten non-consumable electrode body 1 is drilled axially to provide a socket to accommodate a thoriated tungsten insert 2 at its tip.

Referring again to the circular cathode employed in the arc rectifier referred to previously, the wandering of the arc may be entirely eliminated by utilizing the sandwich-type electrode 5, Fig. 3. This electrode is a composite structure consisting of a thoriated tungsten disk 6 sandwiched between pure tungsten discs 7, 7, with all but the annular edge of the former material completely encased.

The basic concept of the invention is the employment of thoriated tungsten for localizing the cathode spot, in conjunction with pure tungsten, upon which metal the cathode spot forms less readily than on thoriated tungsten and thereby serves to confine the arc.

The efficacy of the present composite electrode with respect to stabilizing the arc by confining the arc cathode spot was borne out in several experiments with a tungsten rod ¼-inch in diameter which was drilled axially to accommodate a 1/16-inch diameter thoriated tungsten tip, as illustrated in Figs. 1 and 2 of the drawings. Tests were conducted using direct current in argon gas at currents ranging from 30 to 300 amperes. In all cases, the arc emanated consistently from the thoriated tungsten core of the electrode.

That stabilization of the arc cathode spot is possible, in accordance with the concepts of the present invention, was also confirmed in trial tests on a circular, sandwich-type electrode, as previously described in connection with the disk cathode of an arc rectifier. These tungsten-thoriated tungsten-tungsten disks were clamped tightly together. In every instance that an arc was struck between this electrode, employed as the cathode, and a copper anode, the arc cathode spot remained on the thoriated tungsten portion of the electrode.

It can also be seen that electrodes of relatively large cross sections may be employed when high currents demand their use. In such cases, a tungsten metal electrode of any thickness may be utilized so that the most favorable heat conductivity and electrical resistivity conditions prevail. The setting in of a slender thoriated tungsten insert into the tip of the pure tungsten electrode will ensure stable arc conditions due to the higher affinity of the arc for the thoriated tip.

Still another advantage which accrues with the use of the cored electrode described above is its possible use in A.C. welding. Use of a pure tungsten electrode in A.C. welding is inefficient since, on the half cycle when it serves as the cathode, arc instability occurs. If thoriated tungsten alone is used, when the electrode serves as the anode, heat conductivity is poor, thereby limiting the current-carrying capacity. In accordance with the present invention, however, this problem is eliminated. The pure tungsten portion of the composite electrode becomes useful for its high heat conductivity when it is the anode and, when the cycle is reversed and the electrode becomes the cathode, the thoriated tungsten serves its usefulness because of its superior cathode characteristics, for the reasons previously described.

It is readily apparent that the electrode of the invention may be applied to numerous other uses in a wide variety of forms where arc stability is extremely important. One other such use would be in spark plugs where, at the present time, a considerable amount of wandering of the arc occurs. Because of this, the arc length varies almost constantly. If, however, a tungsten cathode were employed, in the tip of which was inserted thoriated tungsten material, the arc would consistently remain at the narrowest junction between the two electrodes.

The present invention has been discussed in connection with a thoriated tungsten insert. It is believed, however, that the tungsten metal of the insert may be made with oxides other than thoria. Any high-melting, refractory oxide, such as zirconium oxide or cesium oxide, may, therefore, be used with tungsten to form the electrode insert and fall within the scope of the present invention. Thoria, however, is the preferred oxide constituent of the instant electrode insert.

The article herein described represents a novel and extremely useful electrode composition and structure, whereby arc stability is materially improved. Thus, where consistently low voltages are required, as in an arc rectifier, the electrode of the invention represents a material contribution to the art.

We claim:

1. An electric arc electrode composed of the combination of swaged, substantially pure tungsten and thoriated tungsten parts arranged so that the pure tungsten supports and conducts the arc current to the thoriated tungsten part from which an arc is drawn characterized in that such thoriated tungsten contains about 2% of thoria.

2. An electric arc electrode composed of the combination of a substantially pure tungsten body having a socket therein, and a swaged thoriated tungsten insert mounted on said body in such socket for carrying an arc the current of which is conducted through said body characterized in that such thoriated tungsten contains about 2% of thoria.

3. An electric arc electrode composed of the combination of a thoriated tungsten disc sandwiched between supports of substantially pure tungsten for conducting an arc current to said disc to the exposed edge of which an arc is localized.

4. An electric arc electrode consisting of a support that is composed of tungsten, and an arc carrying insert carried by said support, said insert being a swaged member that is composed of tungsten containing about 2% of a refractory oxide selected from the class consisting of thorium, cesium and zirconium.

References Cited in the file of this patent

UNITED STATES PATENTS

| | | |
|---|---|---|
| 1,658,713 | Fuller | Feb. 7, 1928 |
| 2,640,135 | Cobine | May 26, 1953 |